United States Patent
Zhao et al.

(10) Patent No.: US 12,519,975 B2
(45) Date of Patent: Jan. 6, 2026

(54) SIGNALING METHOD FOR SCALING PARAMETER IN CHROMA FROM LUMA INTRA PREDICTION MODE

(71) Applicant: Tencent America LLC, Palo Alto, CA (US)

(72) Inventors: Liang Zhao, Sunnyvale, CA (US); Xin Zhao, San Jose, CA (US); Jing Ye, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 133 days.

(21) Appl. No.: 17/982,967

(22) Filed: Nov. 8, 2022

(65) Prior Publication Data

US 2023/0396799 A1 Dec. 7, 2023

Related U.S. Application Data

(60) Provisional application No. 63/349,472, filed on Jun. 6, 2022.

(51) Int. Cl.
*H04N 19/593* (2014.01)
*H04N 19/176* (2014.01)
*H04N 19/186* (2014.01)

(52) U.S. Cl.
CPC ......... *H04N 19/593* (2014.11); *H04N 19/176* (2014.11); *H04N 19/186* (2014.11)

(58) Field of Classification Search
CPC .. H04N 19/593; H04N 19/176; H04N 19/186; H04N 19/105; H04N 19/11;
(Continued)

(56) References Cited

U.S. PATENT DOCUMENTS

2012/0170858 A1   7/2012 Andersson et al.
2015/0117521 A1*  4/2015 Lim ..................... H04N 19/159
                                              375/240.03

(Continued)

FOREIGN PATENT DOCUMENTS

| JP | 2021-177644 A | 11/2021 | |
| KR | 10-2007-0046786 A | 5/2007 | |
| WO | WO-2023225289 A1 * | 11/2023 | ........... H04N 19/105 |

OTHER PUBLICATIONS

International Search Report dated Mar. 16, 2023 in Application No. PCT/US2022/049390.

(Continued)

*Primary Examiner* — Tat C Chio
(74) *Attorney, Agent, or Firm* — Sughrue Mion, PLLC

(57) ABSTRACT

Methods and apparatuses for performing cross-component intra prediction, including: receiving a current chroma block from a coded bitstream; determining, from the coded bitstream, that a scaling factor used for the current chroma block in a chroma for luma (CfL) intra prediction mode; deriving a predicted scaling factor based on first neighboring samples of the current chroma block and second neighboring samples of a luma block that is co-located with the current chroma block; using the predicted scaling factor as the scaling factor used for the current chroma block in the CfL intra prediction mode; reconstructing the current chroma block after scaling the current chroma block based on the predicted scaling factor.

15 Claims, 10 Drawing Sheets

(58) Field of Classification Search
CPC .... H04N 19/159; H04N 19/70; H04N 19/132; H04N 19/88
USPC .................................................. 375/240.12
See application file for complete search history.

(56) References Cited

U.S. PATENT DOCUMENTS

| | | | | |
|---|---|---|---|---|
| 2022/0124340 | A1* | 4/2022 | Deng | H04N 19/105 |
| 2023/0016994 | A1* | 1/2023 | Laroche | H04N 19/132 |
| 2024/0314337 | A1* | 9/2024 | Francois | H04N 19/167 |

OTHER PUBLICATIONS

Written Opinion of the International Searching Authority dated Mar. 16, 2023 in Application No. PCT/US2022/049390.
Benjamin Bross et al., "Versatile Video Coding Editorial Refinements on Draft 10", Joint Video Experts Team (JVET) of ITU-T SG 16 WP 3 and ISO/IEC JTC 1/SC 29, 20th Meeting, by teleconference, 2020, 512 pages, JVET-T2001-v2.
Xin Zhao et al., "Tool Description for AV1 and libaom", Alliance for Open Media Codec Working Group, 2021, 41 pages, CWG-B078_v1.
Yue Chen et al., "An Overview of Core Coding Tools in the AV1 Video Codec", 2018 Picture Coding Symposium (PCS), 2018, pp. 41-45, IEEE.
Peter De Rivaz et al., "AV1 Bitstream & Decoding Process Specification", 2019, 681 pages.
Communication issued Sep. 10, 2024 in Japanese Patent Application No. 2023-556781.
Luc N. Trudeau et al., "Predicting Chroma from Luma in AV1", 2018 Data Compression Conference, 2018, pp. 374-382.

* cited by examiner

SIGNALING METHOD FOR SCALING PARAMETER IN CHROMA FROM LUMA INTRA PREDICTION MODE

CROSS-REFERENCE TO RELATED APPLICATIONS

This application claims priority from U.S. Provisional Application No. 63/349,472, filed on Jun. 6, 2022, in the United States Patent and Trademark Office, the disclosures of which are incorporated herein by reference in their entirety.

FIELD

Embodiments of the present disclosure relate to a set of advanced video coding technologies and, more specifically, to signaling a scaling parameter for cross-component intra prediction modes.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version, version 0.1.0, of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released. On Jan. 8, 2019, "AV1 Bitstream & Decoding Process Specification" was released, which is a validated version 1.0.0 with Errata 1 of the specification. The AV1 bitstream specification includes a reference video codec. The "AV1 Bitstream & Decoding Process Specification" (Version 1.0.0 with Errata 1), The Alliance for Open Media (Jan. 8, 2019), is incorporated herein in its entirety by reference.

The High Efficiency Video Coding (HEVC) standard is developed jointly by the ITU-T Video Coding Experts Group (VCEG) and the ISO/IEC Moving Picture Experts Group (MPEG) standardization organizations. To develop the HEVC standard, these two standardization organizations work together in a partnership known as the Joint Collaborative Team on Video Coding (JCT-VC). The first edition of the HEVC standard was finalized in January 2013, resulting in an aligned text that was published by both ITU-T and ISO/IEC. After that, additional work was organized to extend the standard to support several additional application scenarios, including extended-range uses with enhanced precision and color format support, scalable video coding, and 3-D/stereo/multiview video coding. In ISO/IEC, the HEVC standard became MPEG-H Part 2 (ISO/IEC 23008-2) and in ITU-T it became ITU-T Recommendation H.265. The specification for the HEVC standard, "SERIES H: AUDIOVISUAL AND MULTIMEDIA SYSTEMS, Infrastructure of audiovisual services—Coding of moving video", ITU-T H.265, International Telecommunication Union (April 2015), is), is incorporated herein in its entirety by reference.

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). Since then, they have been studying the potential need for standardization of future video coding technology which could significantly outperform HEVC in compression capability. In October 2017, they issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/$10^{th}$ Joint Video Exploration Team—Joint Video Expert Team (JVET) meeting. With careful evaluation, JVET formally launched the standardization of next-generation video coding beyond HEVC, i.e., the so-called Versatile Video Coding (VVC). A specification for the VVC standard, "Versatile Video Coding (Draft 7)", JVET-P2001-vE, Joint Video Experts Team (October 2019), is incorporated herein in its entirety by reference. Another specification for the VVC standard, "Versatile Video Coding (Draft 10)", JVET-S2001-vE, Joint Video Experts Team (July 2020), is incorporated herein in its entirety by reference.

SUMMARY

In accordance with an aspect of the disclosure, a method for performing cross-component intra prediction is performed by at least one processor and includes: receiving a current chroma block from a coded bitstream; determining, from the coded bitstream, that a scaling factor used for the current chroma block in a chroma for luma (CfL) intra prediction mode; deriving a predicted scaling factor based on first neighboring samples of the current chroma block and second neighboring samples of a luma block that is co-located with the current chroma block; using the predicted scaling factor as the scaling factor used for the current chroma block in the CfL intra prediction mode; reconstructing the current chroma block after scaling the current chroma block based on the predicted scaling factor.

In accordance with an aspect of the disclosure, a device for performing cross-component intra prediction includes at least one memory configured to store program code; and at least one processor configured to access the program code and operate as instructed by the program code, the program code including: receiving code configured to cause the at least one processor to receive a current chroma block from a coded bitstream; determining code configured to cause the at least one processor to determine, from the coded bitstream, a scaling factor used for the current chroma block in a chroma for luma (CfL) intra prediction mode; deriving code configured to cause the at least one processor to derive a predicted scaling factor based on first neighboring samples of the current chroma block and second neighboring samples of a luma block that is co-located with the current chroma block; using code configured to cause the at least one processor to use the predicted scaling factor as the scaling factor used for the current chroma block in the CfL intra prediction mode; and reconstructing code configured to cause the at least one processor to reconstruct the current chroma block after scaling the current chroma block based on the predicted scaling factor.

In accordance with an aspect of the disclosure, receive a current chroma block from a coded bitstream; determine, from the coded bitstream, that a scaling factor used for the current chroma block in a chroma for luma (CfL) intra prediction mode; derive a predicted scaling factor based on first neighboring samples of the current chroma block and second neighboring samples of a luma block that is co-located with the current chroma block; use the predicted scaling factor as the scaling factor used for the current chroma block in the CfL intra prediction mode; and reconstruct the current chroma block after scaling the current chroma block based on the predicted scaling factor.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

In the present disclosure, the term "block" may be interpreted as a prediction block, a coding block, or a coding unit (CU). The term "block" here may also be used to refer to a transform block.

In the present disclosure, the term "transform set" refers to a group of transform kernel (or candidates) options. A transform set may include one or more transform kernel (or candidates) options. According to embodiments of the present disclosure, when more than one transform options are available, an index may be signaled to indicate which one of the transform options in the transform set is applied for the current block.

In the present disclosure, the term "prediction mode set" refers to a group of prediction mode options. A prediction mode set may include one or more prediction mode options. According to embodiments of the present disclosure, when more than one prediction mode options are available, an index may be further signaled to indicate which one of the prediction mode options in the prediction mode set is applied for the current block for performing the prediction.

In the present disclosure, the term "neighboring reconstructed samples set" refers to a group of reconstructed samples from previously decoded neighboring blocks or reconstructed samples in a previously decoded picture.

In the present disclosure, the term "neural network" refers to a general concept of data processing structure with one or multiple layers, as described herein with reference to "deep learning for video coding." According to embodiments of the present disclosure, any neural network may be configured to implement the embodiments.

Figure 1:
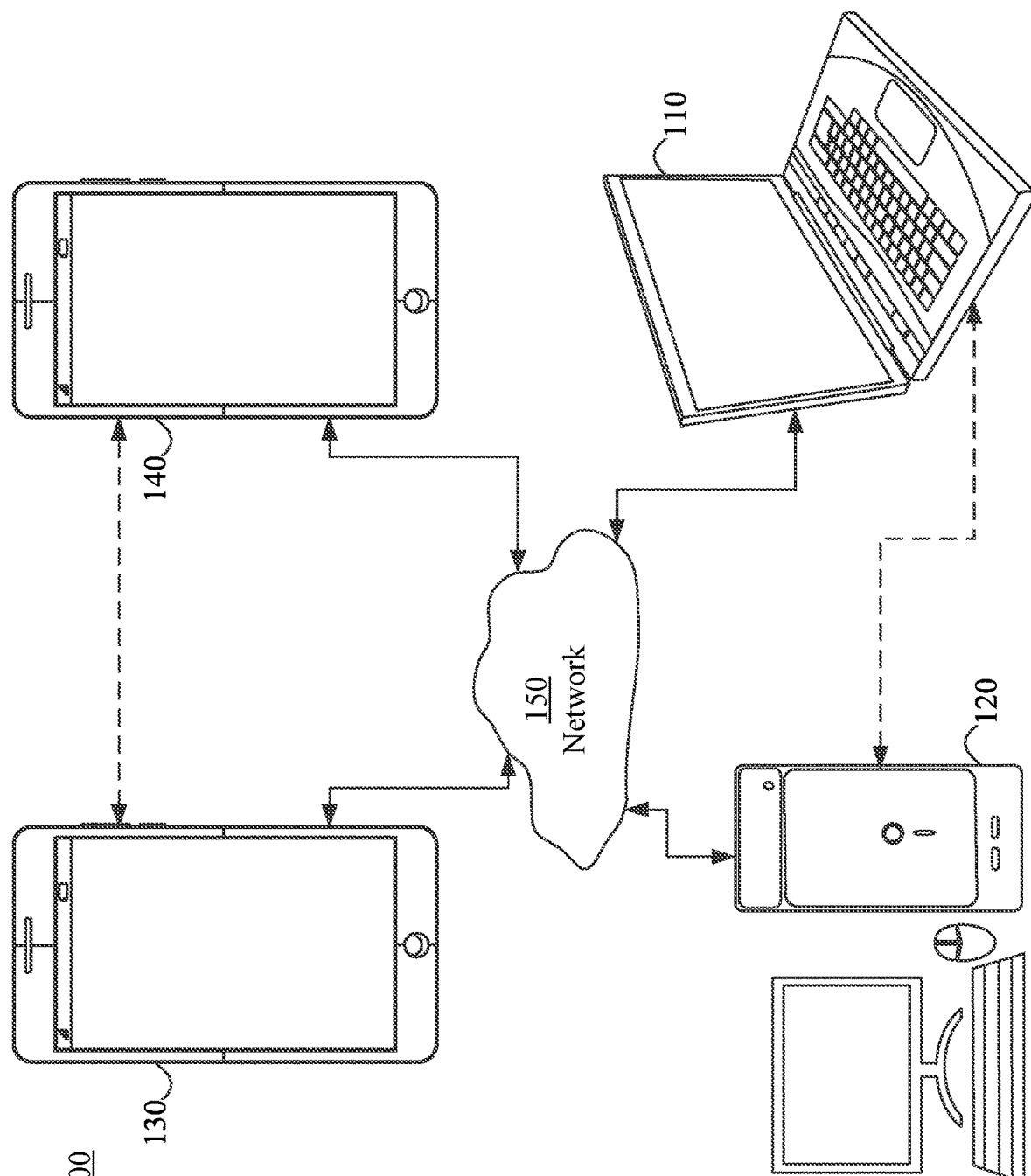
FIG. 1 is a schematic illustration of a simplified block diagram of a communication system, according to embodiments.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
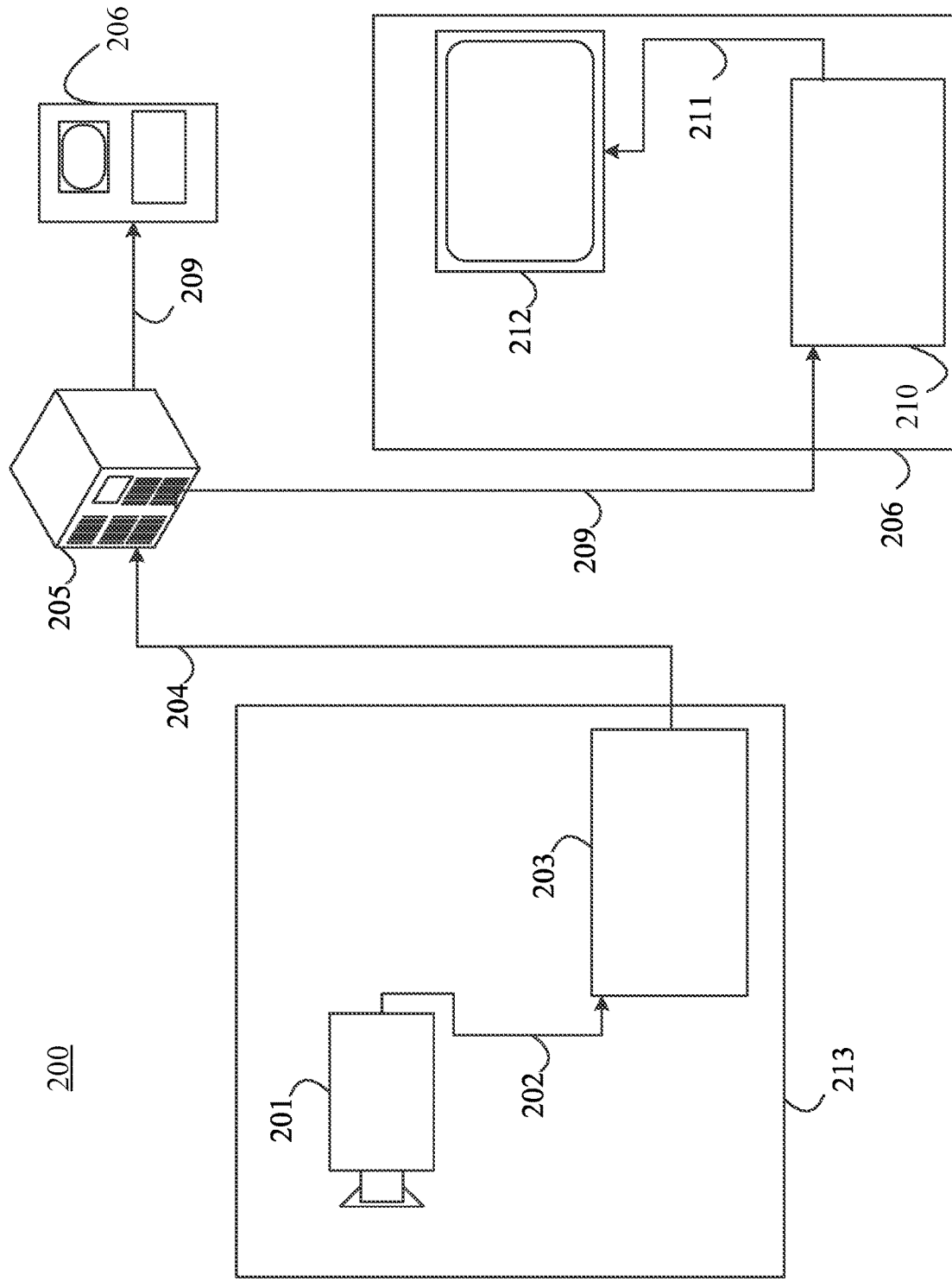
FIG. 2 is a schematic illustration of a simplified block diagram of a communication system, according to embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and can be processed by the encoder (203) coupled to the video source (201), which may be for example a camera. The encoder (203) can include hardware, software, or a combination thereof to enable or implement aspects of the disclosed subject matter as described in more detail below. The encoded video bitstream (204) may include a lower data volume when compared to the sample stream, and can be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
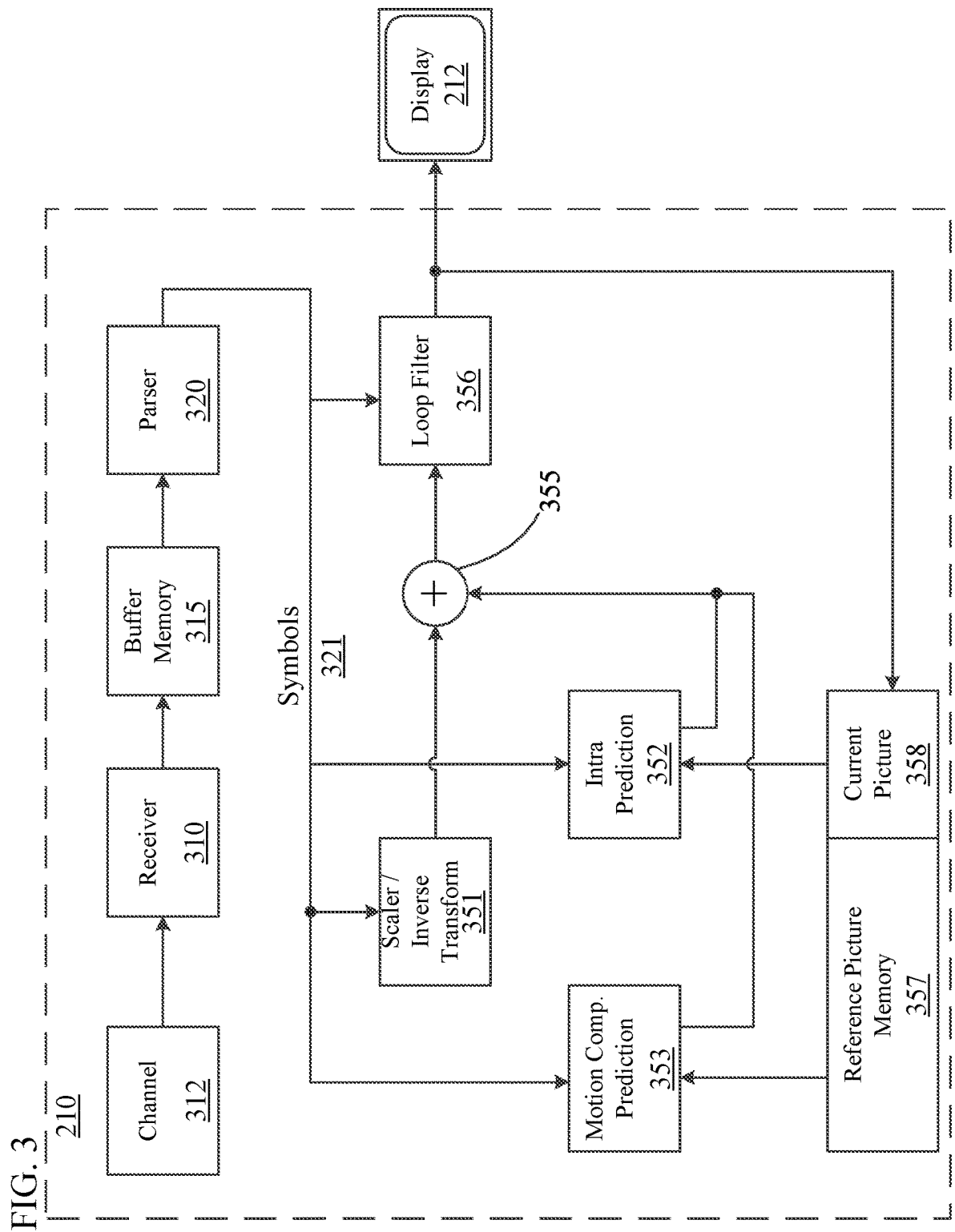
FIG. 3 is a schematic illustration of a simplified block diagram of a decoder, according to embodiments.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer memory (315) may not be used, or can be small. For use on best effort packet networks such as the Internet, the buffer memory (315) may be required, can be comparatively large, and can be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer memory (315), so to create symbols (321).

Reconstruction of the symbols (321) can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks including sample values that can be input into the aggregator (355).

In some cases, the output samples of the scaler/inverse transform unit (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, can be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
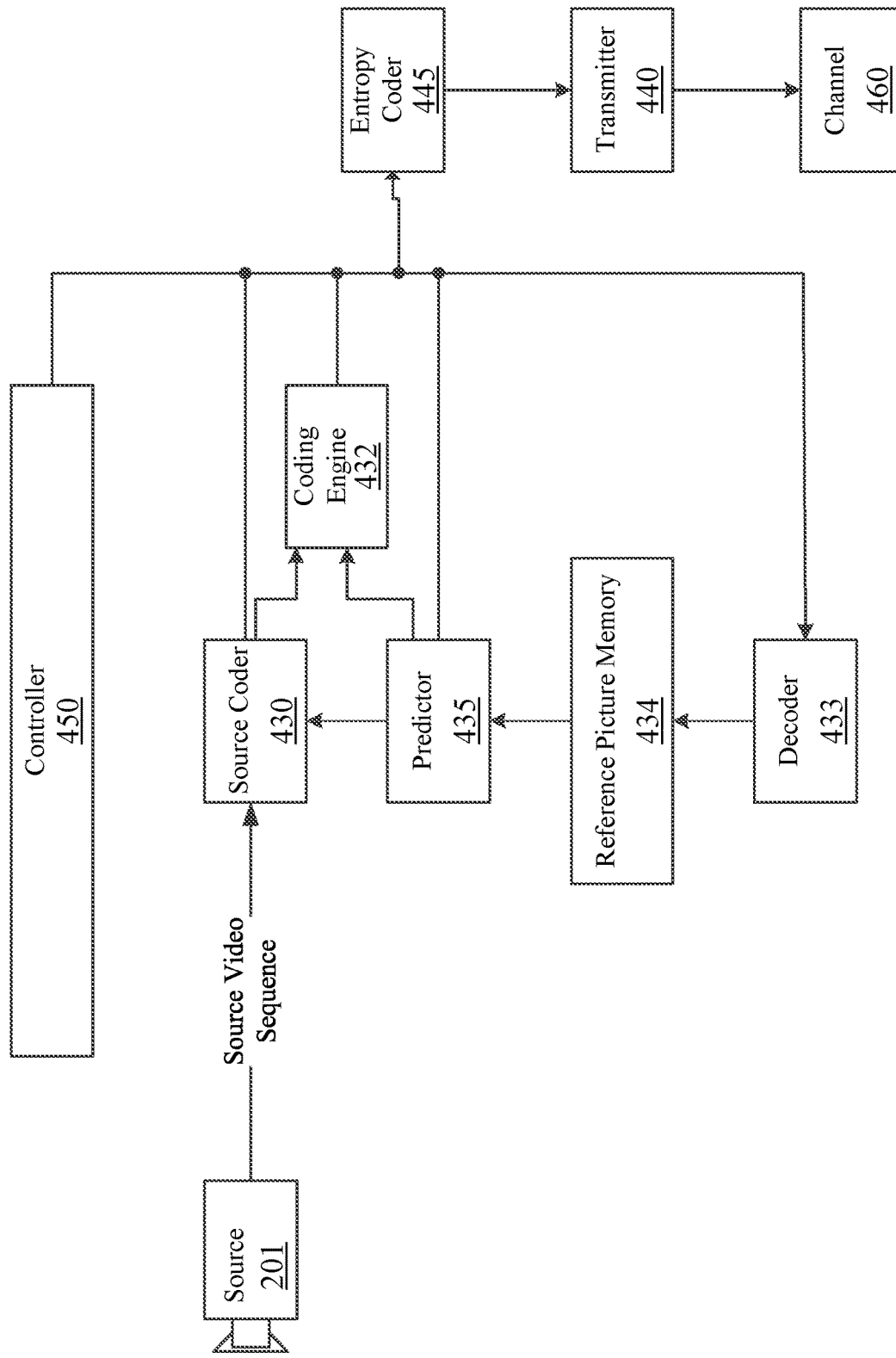
FIG. 4 is a schematic illustration of a simplified block diagram of an encoder, according to embodiments.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (201) may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer memory (315), and parser (320) may not be fully implemented in the local decoder (433).

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Directional Intra Prediction in AV1

Figure 5:
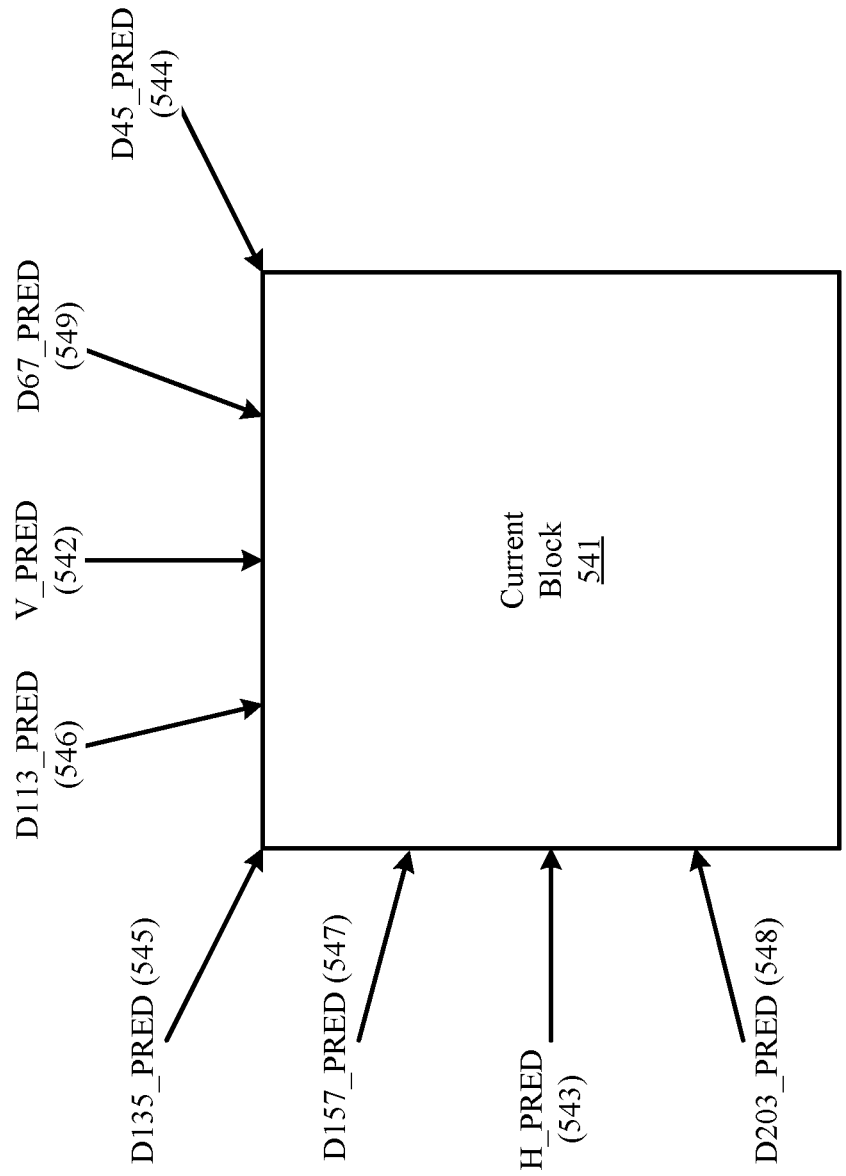
FIG. 5 is a diagram illustrating eight nominal angles in AV1, according to embodiments.

VP9 supports eight directional modes corresponding to angles from 45 to 207 degrees. To exploit more varieties of spatial redundancy in directional textures, in AV1, directional intra modes are extended to an angle set with finer granularity. The original eight angles are slightly changed and made as nominal angles, and these 8 nominal angles are named as V_PRED (542), H_PRED (543), D45_PRED (544), D135_PRED (545), D113_PRED (5446), D157_PRED (547), D203_PRED (548), and D67_PRED (549), which is illustrated in FIG. 5 with respect to a current block (541). For each nominal angle, there are seven finer angles, so AV1 has 56 directional angles in total. The prediction angle is presented by a nominal intra angle plus an angle delta, which is −3~3 multiples of the step size of 3 degrees. In AV1, eight nominal modes together with five non-angular smooth modes are firstly signaled. Then, if current mode is an angular mode, an index is further signaled to indicate the angle delta to the corresponding nominal angle. To implement directional prediction modes in AV1 via a generic way, all the 56 directional intra prediction mode in AV1 are implemented with a unified directional predictor that projects each pixel to a reference sub-pixel location and interpolates the reference pixel by a 2-tap bilinear filter.

Non-Directional Smooth Intra Predictors in AV1

Figure 6:
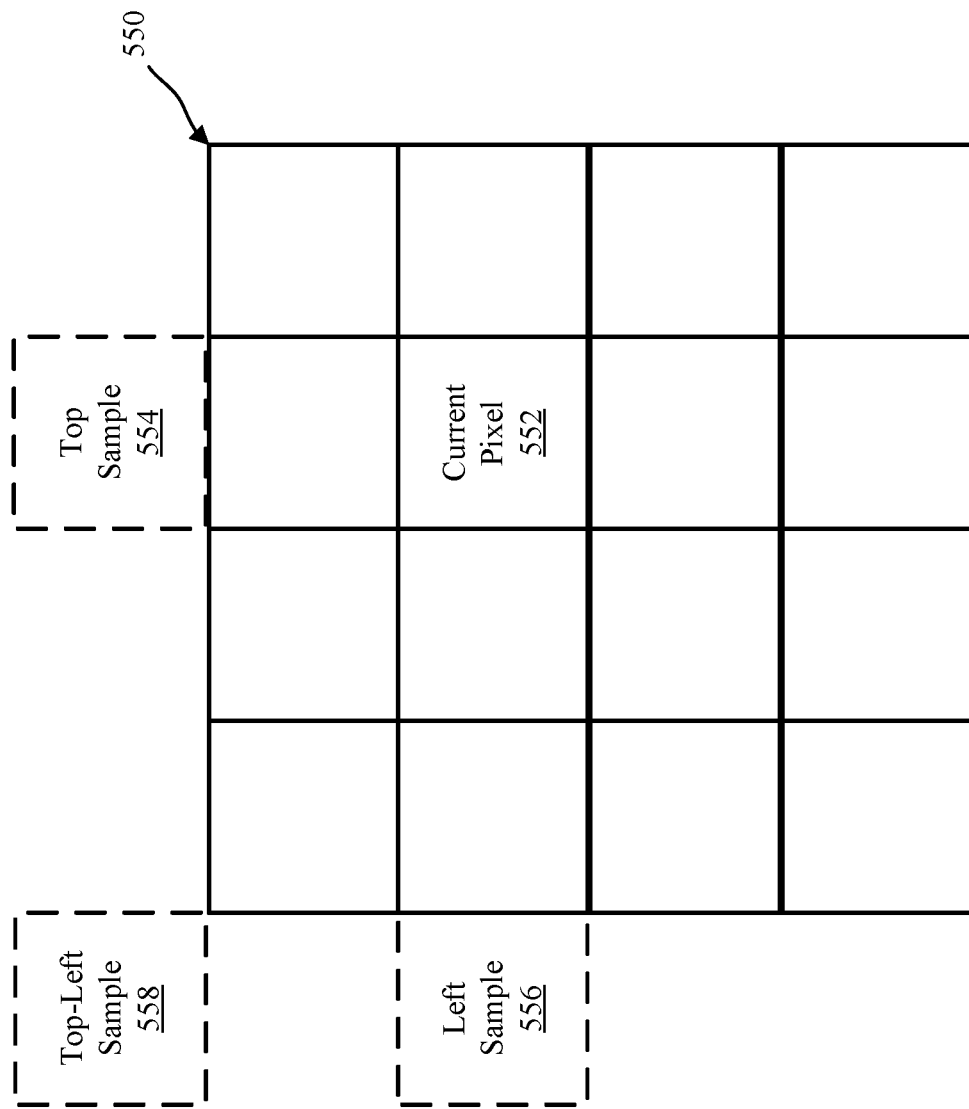
FIG. 6 is a diagram illustrating a current block and samples, according to embodiments.

In AV1, there are five non-directional smooth intra prediction modes, which are DC, PAETH, SMOOTH, SMOOTH_V, and SMOOTH_H. For DC prediction, the average of left and above neighboring samples is used as the predictor of the block to be predicted. For PAETH predictor, top, left, and top-left reference samples are firstly fetched, and then the value which is closest to (top+left−topleft) is set as the predictor for the pixel to be predicted. FIG. 6 illustrates the positions of a top sample (554), a left sample (556), and a top-left sample (558) for a pixel (552) in a current block (550). For SMOOTH, SMOOTH_V, and SMOOTH_H modes, the current block (550) is predicted using quadratic interpolation in vertical or horizontal directions, or the average of both directions.

Chroma Predicted from Luma

In addition to the above modes, Chroma from Luma (CfL) is a chroma-only intra predictor that models chroma pixels as a linear function of coincident reconstructed luma pixels. The CfL prediction may be expressed as shown below in Equation (1):

$$CfL(\alpha) = \alpha \times L^{AC} + DC \quad \text{(Eq. 1)}$$

In Equation (1), $L^{AC}$ denotes the AC contribution of luma component, a denotes the parameter of the linear model, and DC denotes the DC contribution of the chroma component.

Figure 7:
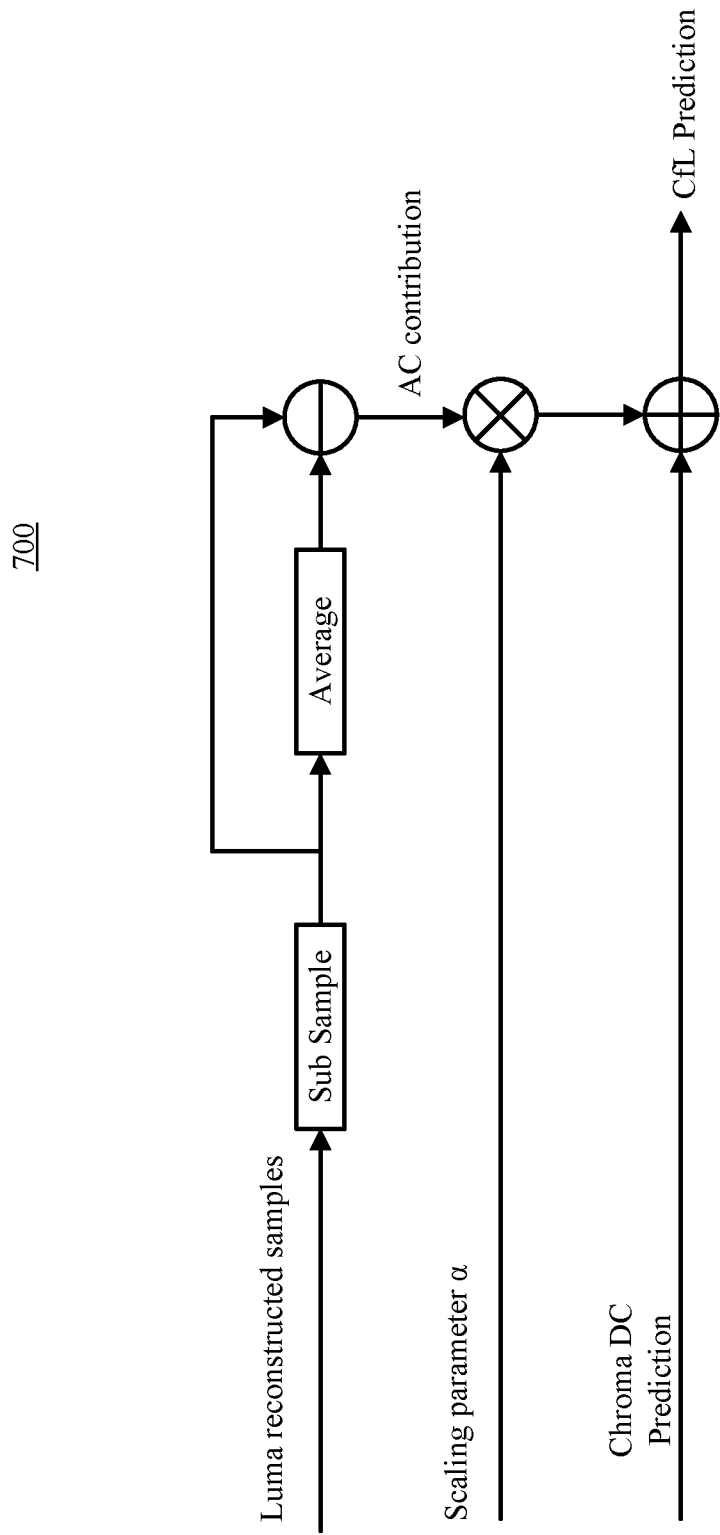
FIG. 7 is a graphical illustration of a linear function corresponding to a chroma for luma mode, according to embodiments.

FIG. 7 provides a graphical illustration of the linear function described by Equation (1). As can be seen in FIG. 7 and Equation (1), the reconstructed luma pixels are sub-sampled into the chroma resolution, and then the average value is subtracted to form the AC contribution. To approximate chroma AC component from the AC contribution, instead of requiring the decoder to calculate the scaling parameters as in some background art, AV1 CfL may determine the parameter a based on the original chroma pixels and signal them in the bitstream. This reduces decoder complexity and yields more precise predictions. As for the DC contribution of the chroma component, it may be computed using intra DC mode, which is sufficient for most chroma content and has mature fast implementations.

When chroma from luma (CfL) mode is chosen, the joint sign of scaling factors for U and V components may be firstly signaled. A sign for one scaling factor may be either negative, zero, or positive. In addition, the combination of (zero, zero) may be not allowed in CfL mode, because it results in "DC" prediction. Therefore, the combination of the sign for two scaling factors may have 8 (3*3−1=8) combinations in total. As a result, the joint sign may be signaled using an eight-value symbol. Only one context may be employed to signal the joint sign.

Regarding the signaling for the magnitude of scaling parameter, a 16-value symbol may be used to represent values ranging from 0 to 2 with a step of ⅛th. It is noted that a 16-value symbol may fully utilize the capabilities of a multi-symbol entropy encoder. The context for signaling the scaling parameter may depend on the value of joint sign.

There may be a strong correlation between the neighboring samples and samples in current block. However, this correlation is not exploited in related-art signaling of the joint sign and magnitude of the scaling parameter in CfL mode.

Therefore, embodiments may provide an improved method of signaling scaling parameters in a CfL mode. Embodiments described herein may also be applied for other modes, for example modes similar to CfL mode, but in which luma is replaced with one specific color component (e.g., R) and chroma is replaced with another specific color component (e.g., G or B).

In embodiments, a linear model with a scaling parameter alpha_predict may be derived based on the neighboring samples of current chroma block and the neighboring samples of the co-located luma block. This scaling parameter alpha_predict may be used for signaling the actual scaling factor in CfL mode for current block. The scaling parameter alpha_predict may also be referred to as a predicted scaling parameter for the current chroma block.

Figure 8:
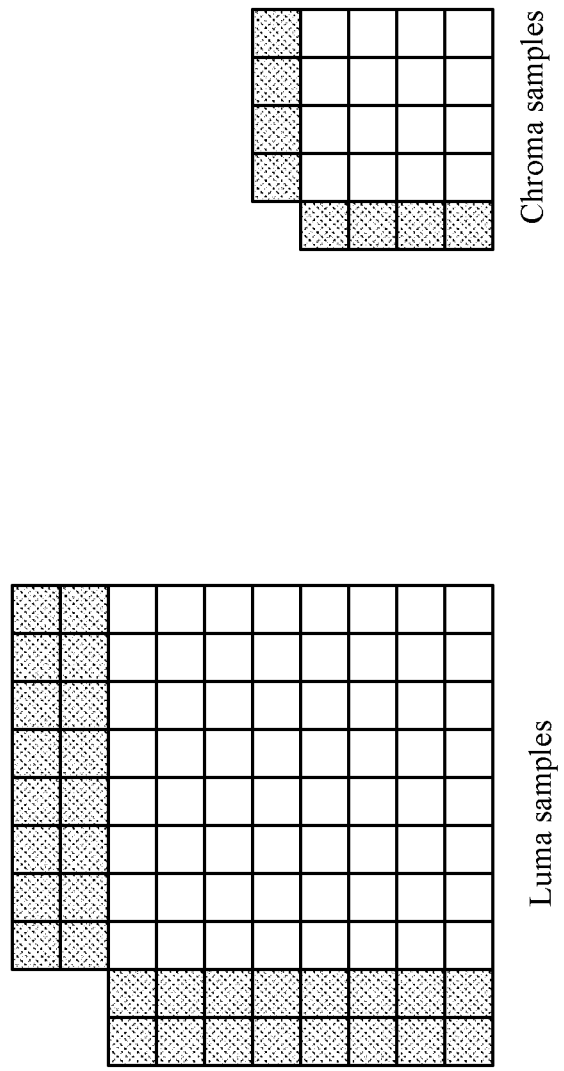
FIG. 8 is a diagram showing current blocks and neighboring samples, according to embodiments.

In embodiments, the above and/or left neighboring samples of a current chroma block, and the above and/or left neighboring samples of a co-located luma block, may be involved in the process of deriving the scaling parameter alpha_predict. One example is shown in FIG. 8, in which the involved neighboring samples are shown as dotted squares, and the current block samples are shown as white squares. As another example, the neighboring samples of the co-located luma block may be downsampled before deriving the predicted scaling factor in linear model if the YUV format of current frame/video sequence is not YUV444.

In embodiments, the least mean square method may be employed to derive the predicted scaling parameter of linear model. For example, the least mean square method may be the same as used in the cross-component linear model (CCLM) mode defined in VVC standard.

In embodiments, the predicted scaling parameter may be derived for U and V component separately. For the U component of current chroma block, the neighboring samples of the U component of the current chroma block and the neighboring samples of the co-located luma block may be used to derive the predicted scaling parameter. For the V component of current chroma block, the neighboring samples of the V component of the current chroma block and the neighboring samples of the co-located luma block may be used to derive the predicted scaling parameter.

In embodiments, the predicted scaling parameter may be used to re-order the available sign value of the scaling factors in CfL mode. The index of the re-ordered sign value may be signaled in the bitstream. An example of the re-ordering of the available sign values is illustrated in Table 1. In this example, the sign value can be either negative (−1), positive (+1), or zero (0). When scale_predict is greater than 0, the available sign value may be re-ordered as follows: positive (+1), zero (0), and negative (−1). So, if the sign value of CfL mode for current chroma block is negative, then 2 may be signaled in the bitstream because the index for negative sign (−1) in Table 1 is 2 when scale_predict is greater than 0.

TABLE 1

Example for re-ordering sign values

| | Scale_predict > 0 | Scale_predict = 0 | Scale_predict < 0 |
| --- | --- | --- | --- |
| index = 0 | +1 | 0 | −1 |
| index = 1 | 0 | +1 | 0 |
| index = 2 | −1 | −1 | +1 |

In embodiments, the predicted scaling parameter may be used to re-order the (absolute) magnitude of the scaling factor in CfL mode. The index of the re-ordered (absolute) magnitude value of scaling factor is signaled into the bitstream. In embodiments, the absolute magnitude of the scaling parameter may be re-ordered based on the difference between the absolute value of the predicted scaling parameter and the absolute value of the available scaling factors. For example, when the absolute value of the predicted scaling parameter is 3/8, then the available scaling factors may be re-ordered as follows (3/8, 2/8, 4/8, 1/8, 5/8, 6/8, 7/8, 1, 9/8, 10/8, 11/8, 12/8, 13/8, 14/8, 15/8, 16/8).

In embodiments, in order to signal the value of scaling factor in CfL mode, a first flag, which may be referred to as a zero_flag, may be signaled in the bitstream to indicate whether the value of scaling factor is equal to zero or not. If the scaling factor is not equal to zero, the predicted scaling factor may be used to re-order all the available scaling factors except zero, including positive and negative scaling factors. The index in the set of reorderd scaling factors may be signaled.

In embodiments, the predicted scaling factor may be used to re-order all the available scaling factors based on the differences between the predicted scaling factor and the available scaling factors. For example, if the predicted scaling factor is 5/8, then all the available scaling factors may be re-ordered as follows 5/8, 4/8, 6/8, 3/8, 7/8, 2/8, 8/8, 1/8, 9/8, −1/8, 10/8, −2/8, 11/8, −3/8, 12/8, −4/8, 13/8, −5/8, 14/8, −6/8, 15/8, −7/8, 16/8, −8/8, −9/8, −10/8, −11/8, −12/8, −13/8, −14/8, −15/8, −16/8). The first 16 scaling factors may be put into the first set, and the last 16 scaling factors may be put into the second set. For example, if the scaling factor of CfL mode for current block is 3/8, then the set index is 0 and the index within the set is 3.

In embodiments, the re-ordered scaling factors may be split into multiple sets based on the index of the re-ordered scaling factors. The set index and index within the set may be signaled in the bitstream.

In embodiments, in order to signal the value of scaling factor in CfL mode, the predicted scaling factor may be used to reorder all the available scaling factors (including zero), and the index of the selected scaling factor in the reordered set of scaling factors may be signaled.

In embodiments, to signal the value of scaling factor in CfL mode, the predicted scaling factor may be used to select a subset of scaling factors from the full set of available scaling factors, and the selection of scaling factor in the subset of scaling factor may be signaled.

In embodiments, the first set of scaling factors with a first precision may be defined, the predicted scaling factor may be used to select a subset of the first set scaling factors, then a second set of scaling factors with a second precision may be further selected, then the selected subset of the first set scaling factors together with the second set of scaling factors form a third set of scaling factors that may include scaling factors with variable precisions. For example, the first precision may include, but is not limited to, 1/4, 1/8, and 1/16 precisions. For example, the second precision may include, but is not limited to, 1/8, 1/16, 1/32, 1/64, and 1/128 precisions. In embodiments, the second precision may be higher than the first precision.

Figure 9:
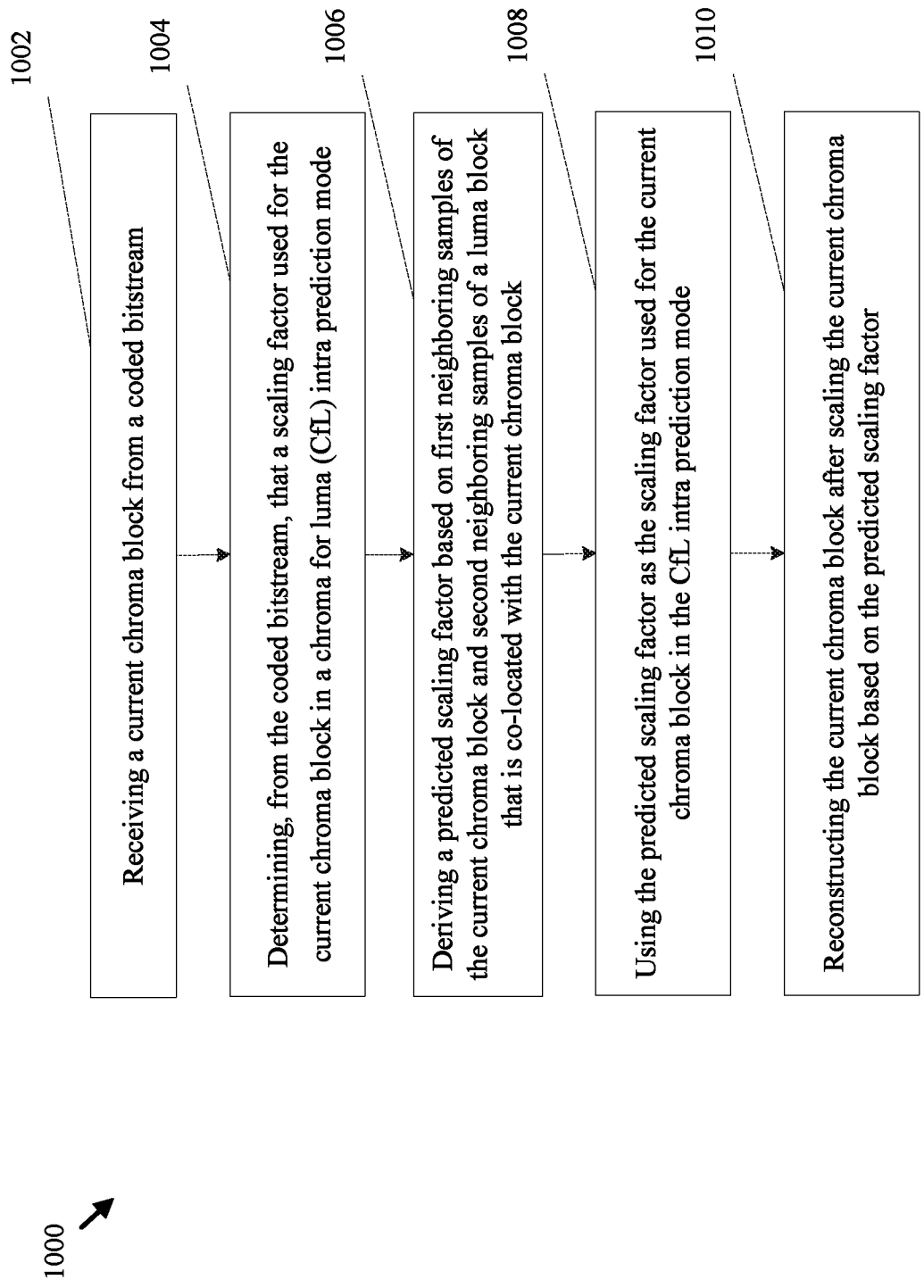
FIG. 9 is a flowchart of a method for signaling scaling parameters for cross-component intra prediction, according to embodiments.

FIG. 9 is a flowchart of a process 1000 for performing cross-component intra prediction, according to embodiments.

As shown in FIG. 9, at operation 1002, the process 1000 includes receiving a current chroma block from a coded bitstream.

As further shown in FIG. 9, at operation 1004, the process 1000 includes determining, from the coded bitstream, that a scaling factor used for the current chroma block in a chroma for luma (CfL) intra prediction mode.

As further shown in FIG. 9, at operation 1006, the process 1000 includes deriving a predicted scaling factor based on first neighboring samples of the current chroma block and second neighboring samples of a luma block that is co-located with the current chroma block.

As further shown in FIG. 9, at operation 1008, the process 1000 includes using the predicted scaling factor as the scaling factor used for the current chroma block in the CfL intra prediction mode.

As further shown in FIG. 9, at operation 1010, the process 1000 includes reconstructing the current chroma block after scaling the current chroma block based on the predicted scaling factor.

In embodiments, the predicted scaling factor may be derived based on at least one chroma sample located above or to a left of the current chroma block, and at least one luma sample located above or to a left of a current luma block.

In embodiments, the predicted scaling factor may be derived using a least mean square calculation.

In embodiments, the predicted scaling factor may be derived separately for a first chroma component and a second chroma component.

In embodiments, the predicted scaling factor may be included in a plurality of scaling factors, and a scaling parameter is used to reorder at least one from among an available sign value for the plurality of scaling factors, and an absolute magnitude corresponding to the scaling factor.

In embodiments, based on a flag indicating that the scaling factor is not 0, a scaling parameter may be used to reorder a plurality of scaling factors except for 0, and the predicted scaling factor may be selected from among the plurality of scaling factors.

In embodiments, the predicted scaling factor is included in a plurality of scaling factors, a scaling parameter may be used to reorder the plurality of scaling factors, and an index may be used to select the predicted scaling factor from among the plurality of scaling factors.

In embodiments, a scaling parameter may be used to select a subset of scaling factors from among a plurality of scaling factors, and the predicted scaling factor may be selected from among the subset of scaling factors based on a syntax element signaled in the coded bitstream.

Although FIG. 9 shows example blocks of process 1000, in some implementations, process 1000 may include additional blocks, fewer blocks, different blocks, or differently arranged blocks than those depicted in FIG. 9. Additionally, or alternatively, two or more of the blocks of process 1000 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques of embodiments of the present disclosure described above, can be implemented as computer software using computer-readable instructions and physically stored in one or more computer-readable media. For example, FIG. 10 shows a computer system (900) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
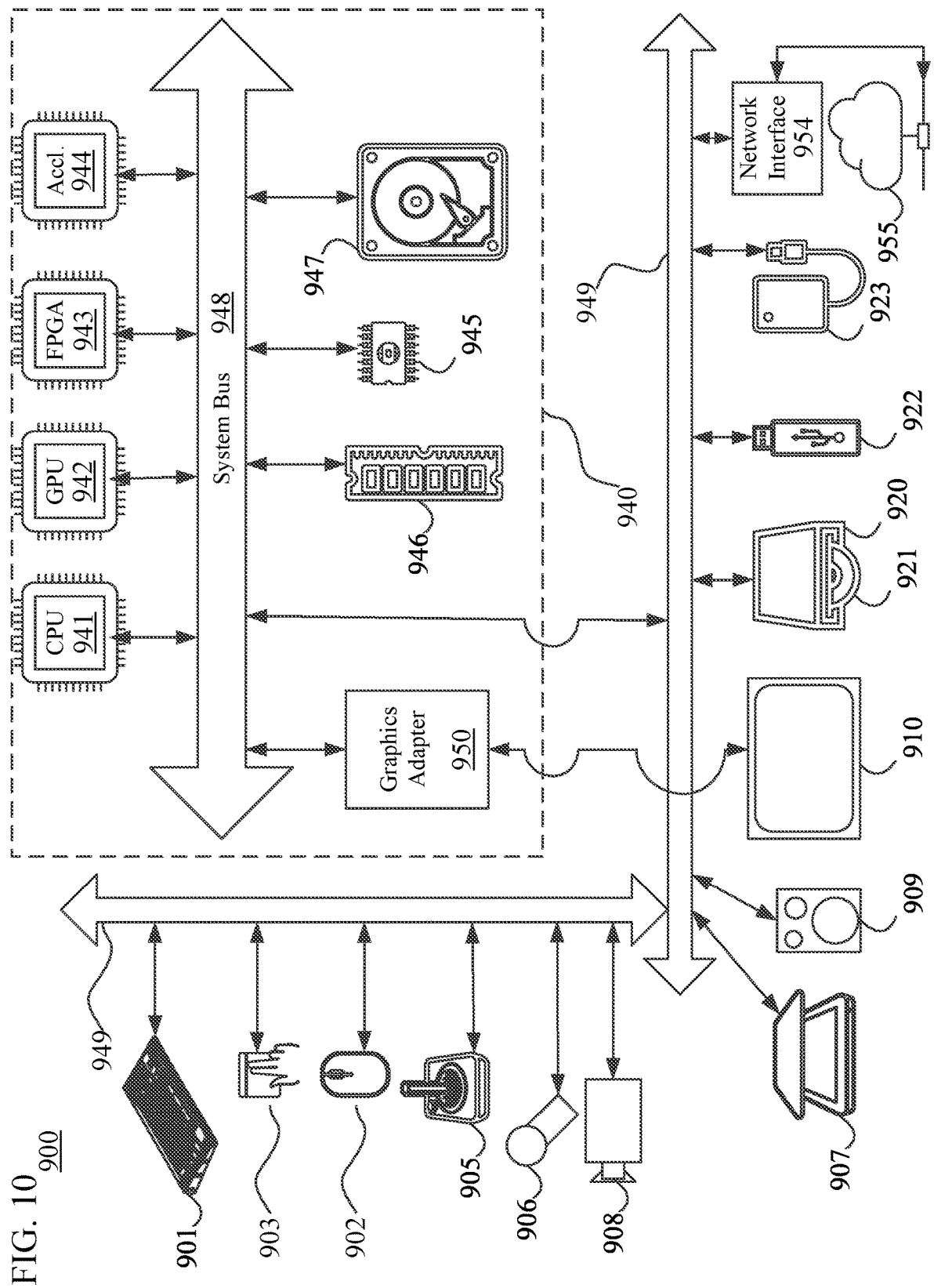
FIG. 10 is a diagram of a computer system suitable for implementing embodiments of the present disclosure.

The components shown in FIG. 10 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices). For example, such devices may be audio output devices (such as: speakers (909), headphones (not depicted)), visual output devices (such as screens (910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900); others are commonly integrated into the core of the computer system 900 by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter (950) may be included in the core (940).

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, an architecture corresponding to computer system (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for performing cross-component intra prediction, the method being performed by at least one processor and comprising:
   receiving a current chroma block from a coded bitstream;
   determining, from the coded bitstream, that a scaling factor used for the current chroma block in a chroma from luma (CfL) intra prediction mode;
   deriving a predicted scaling factor based on first neighboring samples of the current chroma block and second neighboring samples of a luma block that is co-located with the current chroma block;
   using the predicted scaling factor as the scaling factor used for the current chroma block in the CfL intra prediction mode;
   reconstructing the current chroma block after scaling the current chroma block based on the predicted scaling factor, wherein the CfL intra predication mode comprises a sum of (i) a product of the scaling factor with an alternating current (AC) contribution of a luma block, the AC contribution determined in accordance with a difference between reconstructed luma samples subsampled into a chroma resolution and an average of the reconstructed luma samples subsampled into the chroma resolution and (ii) a direct current (DC) contribution of the current chroma block determined in accordance with an intra DC mode, and wherein the predicted scaling factor is derived based on: (i) a row of chroma samples located above the current chroma block, (ii) a row to a left of the current chroma block, (iii) a plurality of rows of luma samples above a co-located luma block, and (iv) a plurality of rows of luma samples to the left of the co-located luma block, wherein the plurality of rows of luma samples above the co-located luma block and the plurality of rows of luma samples to the left of the co-located luma block are down sampled before deriving the predicted scaling factor based on determining a YUV format of the current chroma block is no YUV444, wherein the predicted scaling factor is included in a plurality of scaling factors, wherein a scaling parameter is used to reorder the plurality of scaling factors, and wherein an index is used to select the predicted scaling factor from among the plurality of scaling factors, wherein when the predicted scaling factor is greater than 0, an available sign is reordered as positive (+1), zero (0), and negative (−1), wherein when the predicted scaling factor is equal to zero, the available sign is reordered as zero (0), positive (+1), and negative (−1), and wherein when the predicted scaling factor is less than zero, the available sign is reordered as negative (−1), zero (0), and positive (1).

2. The method of claim 1, wherein the predicted scaling factor is derived using a least mean square calculation.

3. The method of claim 1, wherein the predicted scaling factor is derived separately for a first chroma component and a second chroma component.

4. The method of claim 1, wherein the predicted scaling factor is included in a plurality of scaling factors, and wherein a scaling parameter is used to reorder at least one from among an available sign value for the plurality of scaling factors, and an absolute magnitude corresponding to the scaling factor.

5. The method of claim 1, wherein based on a flag indicating that the scaling factor is not 0, a scaling parameter is used to reorder a plurality of scaling factors except for 0, and wherein the predicted scaling factor is selected from among the plurality of scaling factors.

6. The method of claim 1, wherein a scaling parameter is used to select a subset of scaling factors from among a plurality of scaling factors, and wherein the predicted scaling factor is selected from among the subset of scaling factors based on a syntax element signaled in the coded bitstream.

7. A device for performing cross-component intra prediction, the device comprising:

at least one memory configured to store program code; and at least one processor configured to access the program code and operate as instructed by the program code, the program code including:

receiving code configured to cause the at least one processor to receive a current chroma block from a coded bitstream;

determining code configured to cause the at least one processor to determine, from the coded bitstream, a scaling factor used for the current chroma block in a chroma for luma (CfL) intra prediction mode;

deriving code configured to cause the at least one processor to derive a predicted scaling factor based on first neighboring samples of the current chroma block and second neighboring samples of a luma block that is co-located with the current chroma block;

using code configured to cause the at least one processor to use the predicted scaling factor as the scaling factor used for the current chroma block in the CfL intra prediction mode; and reconstructing code configured to cause the at least one processor to reconstruct the current chroma block after scaling the current chroma block based on the predicted scaling factor, wherein the CfL intra predication mode comprises a sum of (i) a product of the scaling factor with an alternating current (AC) contribution of a luma block, the AC contribution determined in accordance with a difference between reconstructed luma samples subsampled into a chroma resolution and an average of the reconstructed luma samples subsampled into the chroma resolution and (ii) a direct current (DC) contribution of the current chroma block determined in accordance with an intra DC mode, and wherein the predicted scaling factor is derived based on: (i) a row of chroma samples located above the current chroma block, (ii) a row to a left of the current chroma block, (iii) a plurality of rows of luma samples above a co-located luma block, and (iv) a plurality of rows of luma samples to the left of the co-located luma block, wherein the predicted scaling factor is included in a plurality of scaling factors, wherein a scaling parameter is used to reorder the plurality of scaling factors, and wherein an index is used to select the predicted scaling factor from among the plurality of scaling factors, wherein when the predicted scaling factor is greater than 0, an available sign is reordered as positive (+1), zero (0), and negative (−1), wherein when the predicted scaling factor is equal to zero, the available sign is reordered as zero (0), positive (+1), and negative (−1), and wherein when the predicted scaling factor is less than zero, the available sign is reordered as negative (−1), zero (0), and positive (1).

8. The device of claim 7, wherein the predicted scaling factor is derived using a least mean square calculation.

9. The device of claim 7, wherein the predicted scaling factor is derived separately for a first chroma component and a second chroma component.

10. The device of claim 7, wherein the predicted scaling factor is included in a plurality of scaling factors, and wherein a scaling parameter is used to reorder at least one from among an available sign value for the plurality of scaling factors, and an absolute magnitude corresponding to the scaling factor.

11. The device of claim 7, wherein based on a flag indicating that the scaling factor is not 0, a scaling parameter is used to reorder a plurality of scaling factors except for 0, and wherein the predicted scaling factor is selected from among the plurality of scaling factors.

12. The device of claim 7, wherein the predicted scaling factor is included in a plurality of scaling factors, wherein a scaling parameter is used to reorder the plurality of scaling factors, and wherein an index is used to select the predicted scaling factor from among the plurality of scaling factors.

13. A non-transitory computer-readable medium storing instructions, the instructions comprising: one or more instructions that, when executed by one or more processors of a device for performing cross-component intra prediction, cause the one or more processors to:

receive a current chroma block from a coded bitstream;

determine, from the coded bitstream, that a scaling factor used for the current chroma block in a chroma for luma (CfL) intra prediction mode;

derive a predicted scaling factor based on first neighboring samples of the current chroma block and second neighboring samples of a luma block that is co-located with the current chroma block;

use the predicted scaling factor as the scaling factor used for the current chroma block in the CfL intra prediction mode; and reconstruct the current chroma block after scaling the current chroma block based on the predicted scaling factor, wherein the CfL intra predication mode comprises a sum of (i) a product of the scaling factor with an alternating current (AC) contribution of a luma block, the AC contribution determined in accordance with a difference between reconstructed luma samples subsampled into a chroma resolution and an average from the reconstructed luma samples subsampled into the chroma resolution and (ii) a direct current (DC) contribution of the current chroma block determined in accordance with an intra DC mode, and wherein the predicted scaling factor is derived based on: (i) a row of chroma samples located above the current chroma block, (ii) a row to a left of the current chroma block, (iii) a plurality of rows of luma samples above a co-located luma block, and (iv) a plurality of rows of luma samples to the left of the co-located luma block, wherein the predicted scaling factor is included in a plurality of scaling factors, wherein a scaling parameter is used to reorder the plurality of scaling factors, and wherein an index is used to select the predicted scaling factor from among the plurality of scaling factors, wherein when the predicted scaling factor is greater than 0, an available sign is reordered as positive (+1), zero (0), and negative (−1), wherein when the predicted scaling factor is equal to zero, the available sign is reordered as zero (0), positive (+1), and negative (−1), and wherein when the predicted scaling factor is less than zero, the available sign is reordered as negative (−1), zero (0), and positive (1).

14. The non-transitory computer-readable medium of claim 13, wherein the predicted scaling factor is derived using a least mean square calculation.

15. The non-transitory computer-readable medium of claim 13, wherein the predicted scaling factor is derived separately for a first chroma component and a second chroma component.

* * * * *